United States Patent [19]
Robbins et al.

[11] Patent Number: 5,946,614
[45] Date of Patent: *Aug. 31, 1999

[54] PAYPHONE METERING IN A WIRELESS TELEPHONE SYSTEM

[75] Inventors: Barry R. Robbins, San Diego; Gadi Karmi, La Jolla, both of Calif.

[73] Assignee: Qualcomm Incorporated, San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/662,565

[22] Filed: Jun. 13, 1996

[51] Int. Cl.$^6$ .................................................. H04M 11/00
[52] U.S. Cl. .......................... 455/407; 455/406; 379/114; 379/124
[58] Field of Search ..................................... 379/114, 130, 379/131, 132, 143, 144, 145, 146, 154, 155, 112; 455/405, 406, 407, 408, 410, 458

[56] References Cited

U.S. PATENT DOCUMENTS

| | | | |
|---|---|---|---|
| 4,640,986 | 2/1987 | Yotsutani et al. | 455/407 |
| 4,776,000 | 10/1988 | Parienti | 455/407 |
| 5,109,401 | 4/1992 | Hattori et al. | 455/405 |
| 5,134,651 | 7/1992 | Ortiz et al. | 379/112 |
| 5,272,747 | 12/1993 | Meads | 455/407 |
| 5,303,297 | 4/1994 | Hillis | 455/406 |
| 5,359,182 | 10/1994 | Schilling | 455/407 |

FOREIGN PATENT DOCUMENTS

| | | | |
|---|---|---|---|
| 0135196 | 3/1983 | European Pat. Off. | H04Q 7/04 |
| 9520298 | 7/1995 | WIPO | H04Q 7/22 |
| 9609734 | 3/1996 | WIPO | H04Q 7/32 |
| 9624229 | 8/1996 | WIPO | H04Q 7/32 |

*Primary Examiner*—Edward F. Urban
*Assistant Examiner*—Thuan T. Nguyen
*Attorney, Agent, or Firm*—Russell B. Miller; Brian S. Edmonston; Charles D. Brown

[57] ABSTRACT

The wireless system includes one or more payphones from which users may initiate payphone calls. A mobile switching center connects telephone calls initiated from wireless payphones to external telephone systems such as the public switch telephone network (PSTN). To meter charges incurred during the telephone call within an external system, the external system transmits periodic metering pulses to the mobile switching center. Each pulse is representative of a predetermined amount of money associated with the telephone call. The rate at which the periodic pulses are transmitted to the mobile switching center depends upon the current billing rate and may be affected by, for example, the time of day. Rather than the forwarding all of the metering pulses to the wireless payphone, therefore consuming a portion of the bandwidth available for wireless telephone calls, the mobile switching center calculates a steady state billing rate from the metering pulses, then transmits only the steady state billing rate to the wireless payphone. The ireless payphone calculates charges associated with the telephone call based upon the steady state billing rate and displays the resulting charges to the user. Once the mobile switching center has transmitted the steady state billing rate signal to the wireless payphone, a second steady state billing signal is not transmitted unless and until the billing rate for the telephone call changes as detected from a change in the rate of received metering pulses from the external system. In one arrangement, the mobile switching center filters out all metering pulses and transmits only steady state billing rate signals to the wireless payphone. In another arrangement, the mobile switching center transmits metering pulse signals to the wireless payphone until the steady state rate has been determined, then transmits a single steady state billing rate signal. If the billing rate changes, the mobile switching center again forwards metering pulses to the wireless payphone until the new steady state billing rate can be determined.

4 Claims, 3 Drawing Sheets

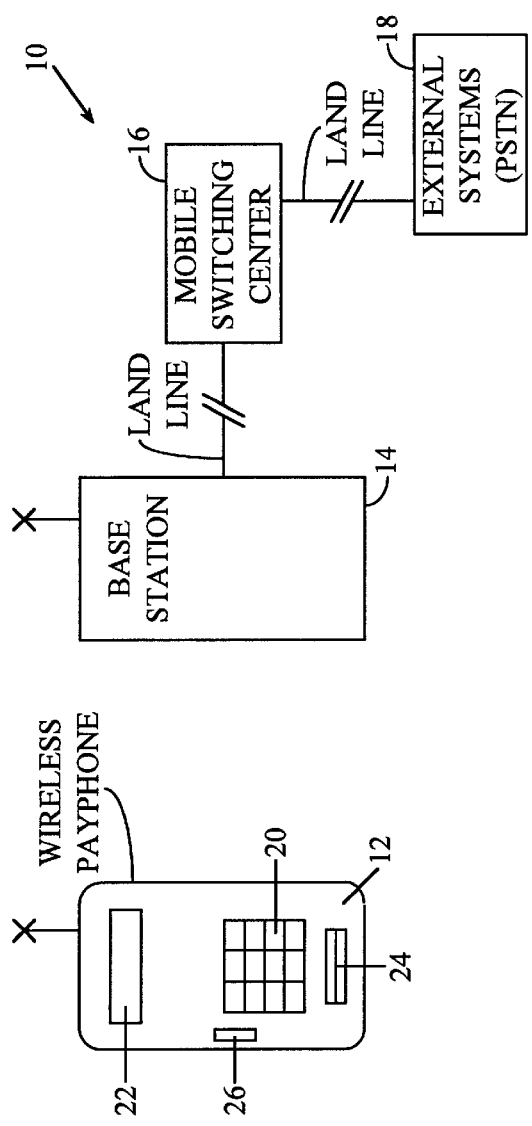
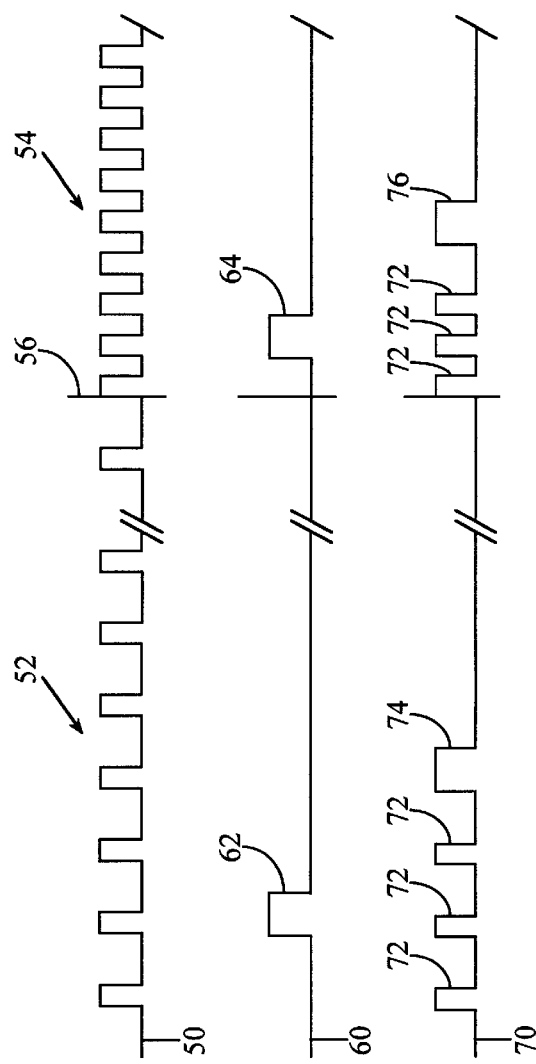
FIG. 1
FIG. 2
FIG. 3
FIG. 4

PAYPHONE METERING IN A WIRELESS TELEPHONE SYSTEM

BACKGROUND OF THE INVENTION

I. Field of the Invention

The invention generally relates to wireless telephone systems and in particular to public payphones connected to wireless telephone systems.

II. Description of the Related Art

Wireless telephone systems including, for example, cellular telephone systems and wireless local loop systems, have become quite popular for private, individual use. Recently, wireless telephone systems are being extended to include public payphones. Wireless payphones may be configured like payphones connected to conventional land lines, such as the public switched telephone network (PSTN), but the wireless payphone transmits telephone call signals to a remote base station rather than directly onto hardwired land lines. The remote system may include, for example, space based satellites, cellular base stations, or the like. Wireless payphones are particularly desirable for use within areas that do not include conventional land lines, including remote portions of the United States as well as portions of developing countries. Wireless payphones may also be advantageously employed even within areas having conventional land lines to allow consumers a choice between the telephone company operating the land lines and telephone companies offering wireless service in the area. Wireless payphones are also ideal for use within commercial airliners, trains, buses, ships, or the like, wherein conventional land lines are not available.

However, problems arise in implementing wireless payphones insofar as metering the charges incurred by the user of the payphone. With a conventional payphone connected to a land line, metering is typically achieved by transmitting metering pulses to the payphone from the network. The metering pulses are typically brief tones set at, for example, 4,000 hertz (Hz). The payphone may include a filter for filtering out the tone so that the user does not hear the tones during the telephone call. Usually, the payphone is preprogrammed with some monetary value associated with each metering pulse to allow the actual charges incurred during a telephone call to be calculated from the total number of metering pulses received during the telephone call. Each individual metering pulse may represent, for example, one or two cents worth of telephone calling time. During peak hours, when telephone calling rates are at their highest, the metering pulses are transmitted fairly frequently. During off hours, when calling rates are lower, the metering pulses are transmitted less frequently.

Typically, the user is required to insert some initial quantity of money into the payphone to initiate a telephone call. Thereafter, while the telephone call is in progress, metering pulses are received by the payphone and the amount of money associated with each metering pulse is deducted from the initial amount of money inserted. A display may be provided to indicate to the user the amount of money remaining. Also, typically, as the amount of money remaining decreases below some minimum threshold, perhaps one dollar, a warning message or the like is provided to the user indicating that the telephone call may be automatically terminated if additional money is not inserted into the payphone. In many state of the art payphones, the user is not limited to inserting cash only. Various types of debit cards may alternatively be employed wherein the debit card is preprogrammed with some quantity of money. Alternatively, the charges of the telephone call may be billed to the receiving party or perhaps to a credit card account, calling card account or the like. Indeed, many state of the art payphones do not accept cash whatsoever but operate only using debit cards or some other cashless method.

Although the above-described metering technique works effectively for payphones connected to land lines, problems arise in attempting to implement the same technique for wireless payphones. With most wireless systems there is a need to minimize the amount of information transmitted from base stations to remote wireless telephones in order to maximize the capacity of the system. Avoiding transmission of redundant or uneccessary signaling information is one way of reducing the overall bandwidth consumed per call, and thereby maximizing system capacity. Dozens of wireless payphone calls may need to be transmitted more or less simultaneously within a wireless telephone system. The transmission of periodic metering pulses within each payphone call, particularly during peak hours, consumes a significant amount of bandwidth, which impacts the total number of calls that can be placed simultaneously. The problem is of particular concern within wireless systems employing digital transmission techniques such as code division multiple access (CDMA). For CDMA, the manner by which voice signals are processed makes it difficult to transmit voice signals with high frequency tones superimposed thereon. Accordingly, for a hypothetical wireless system to transmit metering pulses to a payphone, it may be necessary to convert the pulses to data packets, such as packets of the type employed in transmitting command and control signals, for interleaving with data packets containing digitized voice data. For a wireless local loop systems employing CDMA, in particular, constraints on the formatting of such packets could significantly affect the amount of bandwidth available for other signals such as commands and control signals and digitized voice signals. Hence, if additional data signals corresponding to metering pulses were transmitted throughout the entire duration of a telephone call to a wireless payphone, the amount of available bandwidth for the corresponding voice signals could be further reduced significantly, perhaps limiting the maximum possible quality of the transmitted voice signal. Such problems may be even more significant for wireless payphones mounted within aircraft, ships, or the like wherein voice quality may already be relatively limited by other transmission constraints. The need to process periodic metering signals throughout an entire telephone call may also impose a burden on the microprocessor, or other device, processing the various digital signals received from the remote station.

Accordingly, it would be desirable to provide an improved method and apparatus for performing payphone metering within a wireless telephone system incorporating one or more wireless payphones and it is to that end that aspects of the invention are primarily drawn.

SUMMARY OF THE INVENTION

In accordance with one aspect of the invention, an apparatus is provided for use with a wireless telephone system. The apparatus includes a means for receiving metering signals from an external system representative of billing charges for a particular telephone call carried between the wireless telephone and the external system. The apparatus also includes a means for determining a steady state billing rate for the telephone call from the metering signals and a means for transmitting a signal to the wireless telephone representative of the determined steady state billing rate.

The apparatus may additionally include a means for detecting a change in the steady state billing rate for the telephone call and for determining and transmitting a new steady state billing rate.

With this apparatus, metering signals from the external system need not be forwarded to the wireless telephone. Rather, only a single signal representative of the steady state billing rate need be transmitted. If the rate changes, then another single signal is transmitted representative of the new steady state billing rate. As such, fewer signals are transmitted to the wireless telephone system and less bandwidth is consumed than traditional systems, which transmit all metering pulses.

In one exemplary embodiment, the wireless telephone is a wireless payphone configured to transmit and receive signals to and from a base station in accordance with CDMA protocols. The wireless telephone includes a means for receiving signals representative of the steady state billing rate for the telephone call and means for using this rate to calculate an amount of charges incurred during the telephone call. The wireless telephone may also include a means for displaying the amount of charges incurred during the telephone call to a user operating the wireless telephone.

The use of relatively few steady state billing rate signals instead of frequent periodic individual metering signals is particularly desirable within wireless cellular systems or wireless local loop systems, because significantly less bandwidth may be consumed by the few steady state signals rather than the many frequent periodic metering signals. Accordingly, more bandwidth is available for other signals. The additional bandwidth may be used to process additional telephone calls or for allowing greater amounts of data to be transmitted during the telephone call. Hence, depending upon the implementation, the additional bandwidth may allow for an improvement in voice quality over systems requiring transmission of periodic metering pulses, or an increase in overall system capacity.

In the exemplary embodiment having the wireless payphone employing CDMA, the only metering signals received by the wireless payphone are billing rate signals which indicates a particular steady state rate of billing. A first billing rate signal is received at the beginning of a telephone call. Additional billing rate signals are received only if the billing rate changes. In an alternative embodiment, the wireless payphone initially receives digitized signals corresponding to individual metering pulses until the steady state billing rate has been determined. The wireless payphone then receives a single steady state billing rate signal and no longer receives the periodic metering signals. In other arrangements, additional or alternative signals may be provided, consistent with the principles of the invention, for minimizing or eliminating the number of metering pulse signals required for transmission to the wireless telephone.

With the invention, the general objective set forth above is achieved. Other objects, as well as other features and advantages of the invention, will be apparent from the accompanying drawings and from the detailed description which follows.

BRIEF DESCRIPTION OF THE DRAWINGS

FIG. 1 is a block diagram of a wireless payphone system configured in accordance with the invention.

FIG. 2 is a timing diagram illustrating periodic metering pulses transmitted within a conventional payphone system.

FIG. 3 is a timing diagram illustrating steady state billing rate signals transmitted to the wireless payphone of FIG. 1.

FIG. 4 is a timing diagram illustrating an alternative sequence of signals for transmission to the wireless payphone of FIG. 1 wherein both metering pulses and steady state billing rate signals are employed.

DETAILED DESCRIPTION OF EXEMPLARY EMBODIMENTS OF THE INVENTION

Figure 5:
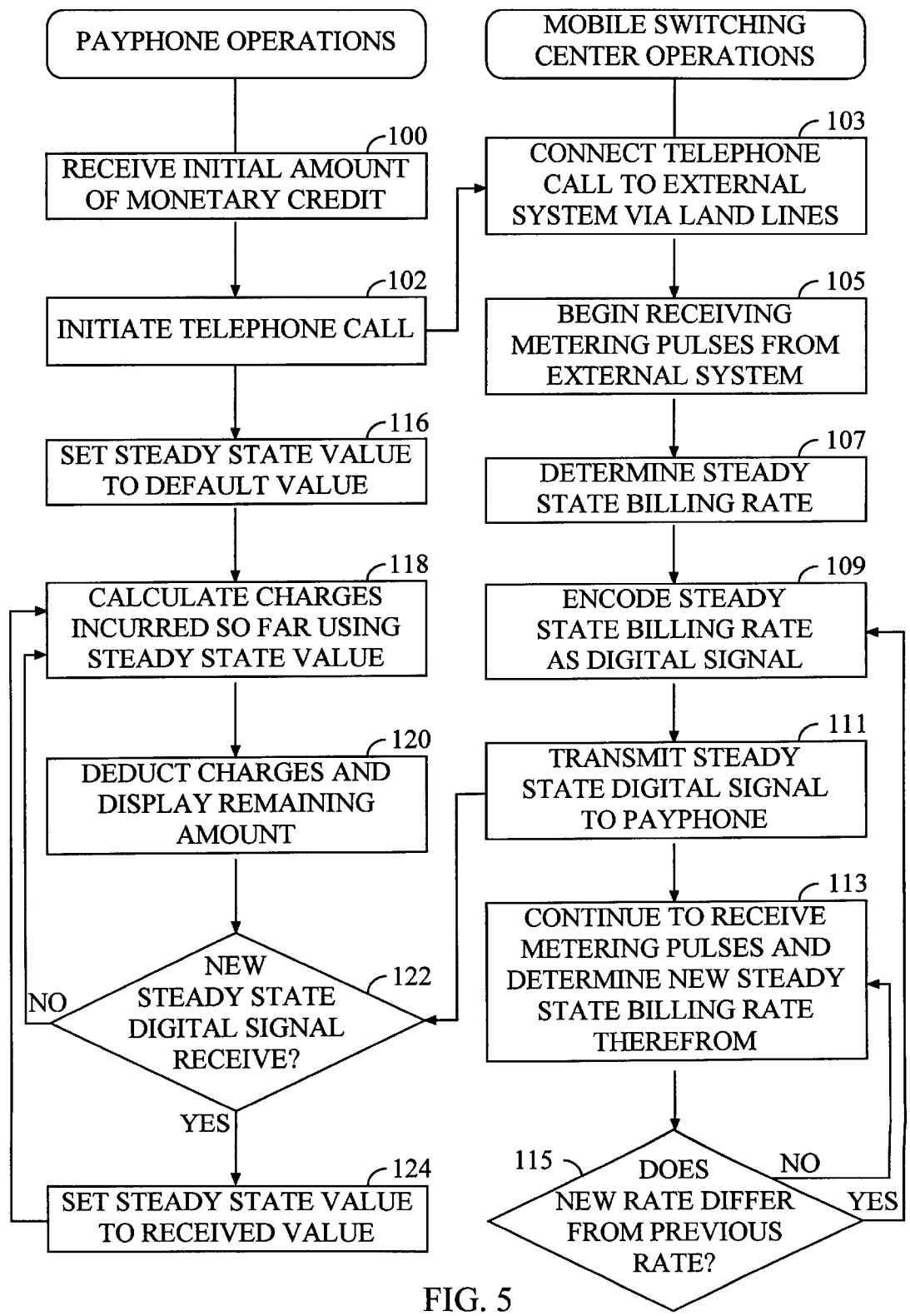
FIG. 5 is a flowchart illustrating a method for processing steady state billing rate signals of the type illustrated in FIG. 3.

With reference to the figures, exemplary embodiments of the invention will now be described. The exemplary embodiments are described primarily with reference to block diagrams and flowcharts. As to the flowcharts, each block within the flowchart represents both a method step and an apparatus element for performing the method step. Herein, the apparatus element may be referred to as a means for, an element for, or a unit for performing the method step. As to the block diagrams, it should be appreciated that not all components necessary for complete implementation of a practical system are always illustrated or described in detail. Rather, only those components necessary for a thorough understanding of the invention are illustrated and described. Furthermore, components which are either conventional or may be readily designed and fabricated in accordance with the teachings provided herein are not described in detail.

FIG. 1 illustrates a wireless telephone system 10 employing one or more wireless payphones 12, one or more base stations 14 and a mobile switching center 16. The wireless payphones may be mounted at fixed locations, such as within buildings or on city streets, or may by mounted within mobile devices, such as within planes, trains, ships, or buses. Mobile switching center 16 is connected by a land line to an external system 18 which may form part of, or be connected to, a PSTN system.

Wireless payphone 12 includes a numeric keypad 20, an alphanumeric display 22, a slot 24 for receiving a debit card and a slot 26 for receiving change or other currency. A user initiates a telephone call using wireless payphone 12 by either inserting an initial amount of currency into slot 26 or by inserting a debit card into slot 24. The amount of currency or other monetary credit entered by the user is displayed within alphanumeric display 22. Alternatively, the user initiates the telephone call by identifying a credit card account or calling card account for billing purposes using numeric keypad 20. In any case, appropriate signals for initiating the wireless telephone call are transmitted from wireless payphone 12 to base station 14 in accordance with one of a variety of wireless transmission protocols including, for example, CDMA, frequency division multiple access (FDMA) and time division multiple access (TDMA). In the following, it will be assumed that CDMA protocols will be employed, but principles of the invention are applicable to other types of wireless transmission systems and to non-wireless transmission systems as well.

Signals transmitted by wireless payphone 12 are received by base station 14 and forwarded to mobile switching center 16 for interfacing with external system 18. To this end, mobile switching center 16 may convert wireless telephonic signals received from base station 14 to conventional tone signals for use with PSTN systems. The tone signals are forwarded to external system 18 for interconnection with other telephones within the overall PSTN system for ultimate connection with the telephone specified by the telephone number entered by the user of wireless payphone 12. Once the telephone call has been established, external system 18 begins to transmit periodic metering pulses to mobile switching center 16 for use in identifying the amount of charges incurred during the telephone call using external system 18. The metering pulses are brief tones set to, for example, 4,000 Hz. As noted above, each pulse is representative of a predetermined amount of money. Each pulse may represent, for example, two cents worth of calling time.

FIG. 2 illustrates an exemplary set of metering pulses 50. An initial portion of pulses are repeated at a first periodic rate during time period 52. A second portion are repeated at a second and somewhat faster periodic rate during time period 54. The difference in metering pulse rates occurs, for example, as a result of an increase in telephone calling charges caused by a transition from non-peak to peak calling hours. Within FIG. 2 the transition occurs at point 56. In one example, pulses of time period 52 are transmitted at a rate of about one pulse per second whereas pulses of time period 54 are transmitted at a somewhat higher rate such as 1.2 pulses per second. The higher rate for pulses of time period 54 is representative of a higher telephone call cost as a function of time.

Sequences of metering pulses, such as the sequence illustrated in FIG. 2, are transmitted from external system 18 of FIG. 1 to mobile switching center 16. In conventional payphone systems, the metering pulses are merely forwarded to the payphone which calculates telephone call charges directly therefrom. With the system of FIG. 1, however, mobile switching center 16 converts the sequence of numerous repeated metering pulses into a sequence of relatively few steady state billing rate signals, an example of which is illustrated in FIG. 3. More specifically, FIG. 3 illustrates a sequence 60 having a single steady state billing rate pulse 62 associated with time period 52 and a second steady state billing rate pulse 64 associated with time period 54. Pulses 62 and 64 are configured, for example, as digital sequences of bits containing a binary representation of the billing rate of the corresponding time period. For example, if metering pulses of time period 52 of FIG. 2 each represent two cents worth of calling time and are transmitted one second apart, then signal 62 contains a bit pattern representative of a billing rate of two cents per second or $1.20 per minute. Likewise, if the metering pulses of time period 54 of FIG. 2 are transmitted at 1.2 pulses per second, then signal 64 contains a bit pattern representative of a billing rate of 2.4 cents per second or $1.44 per minute.

Any of a wide variety of encoding techniques may be employed for encoding the associated metering rate within the steady state billing rate signals. The billing rate itself may be calculated by mobile switching center 16 merely by counting the number of metering pulses received during a predetermined period of time, such as 10 seconds, then averaging over the time period. Alternatively, the mobile switching center may merely calculate the time period elapsed between center points of any two successive pulses. The former technique has the advantage that a more precise, time-averaged billing rate can be calculated which is relatively free of noise or other statistical errors. The latter technique has the advantage of allowing the billing rate to be calculated more promptly and recalculated with each successive pulse. In either case, mobile switching center 16 transmits a steady state billing rate signal once the billing rate has been established. Then, mobile switching center 16 monitors received pulses to determine whether the steady state billing rate has changed. Once a change has been detected, mobile switching center 16 calculates the new steady state rate and generates a new steady state billing rate encoded signal. The various operations performed by mobile switching center 16 may be performed using hardware, software, firmware or combinations thereof.

The steady state signals are forwarded, along with other signals such as voice signals, to base station 14 for transmission to the payphone. The steady state signals may be interleaved with voice signals and other command and control signals in accordance with CDMA protocols. Mobile switching center 16 preferably filters out the tones of the metering pulses so that bandwidth of the telephone call is not consumed by the metering pulses and so that the user does not hear the metering pulses.

Wireless payphone 12 receives signals transmitted from base station 14 and extracts the steady state signals therefrom. From the steady state signals, the payphone calculates the amount of charges incurred during the telephone call as a function of time. To this end, wireless payphone 12 preferably includes a clock or other timing device. Initially, wireless payphone 12 calculates the total amount of charges incurred from the initiation of the telephone call and deducts that amount from the amount of money, or other monetary credit, initially received by the payphone. Display 22 is updated to reflect the remaining amount of money. As the telephone call proceeds, wireless payphone 12 periodically deducts amounts of money from the remaining amount of money in accordance with the amount of time spent and the steady state billing rate. The amount of monetary credit displayed in the alpha-numeric display is updated accordingly. Wireless payphone 12 also monitors received signals to determine if a new steady state signal is received representative of a new steady state billing rate. If so, wireless payphone 12 thereafter calculates additional charges using the new steady state billing rate value. If the new rate is higher than the old rate, then the display will reveal to the user that charges are being incurred more quickly. As the amount of remaining money or credit is depleted, wireless payphone 12 may notify the user that the telephone call is about to be automatically terminated. This may be performed by, for example, superimposing an audio tone over the voice conversation or by providing a special alpha-numeric string within display 22. In any case, either the user ends the telephone call, adds additional money or monetary credit, or allows the telephone call to be automatically terminated.

Thus, during the telephone call wireless payphone 12 receives only an occasional steady state billing rate signal. Indeed, if the billing rate of external system 18 does not change during the telephone call, then wireless payphone 12 will receive only a single steady state billing rate signal. An additional signal is only received if the billing rate changes, such as can occur during a transition from off-peak to on-peak hours. Hence, only one or two steady state signals are received during the telephone call. This is in contrast with conventional payphone systems which receive each of the periodic metering pulses. Accordingly, considerable bandwidth is saved within the transmission system by greatly limiting the number of signals that need to be transmitted. The reduction in bandwidth consumption is advantageous within wireless systems, and particularly within wireless local loop systems, wherein the available bandwidth is already limited by other constraints including the need to transmit command and control signals as well as the voice signals.

In the arrangement thus far described, mobile switching center 16 determines the steady state billing rate before transmitting any billing information signals to wireless payphone 12. In an alternative arrangement, mobile switching center 16 initially transmits metering pulse signals to wireless payphone 12 until the steady state rate can be determined. Then, mobile switching center 16 transmits the steady state signal and terminates transmission of metering pulse signals. An exemplary resulting pulse sequence 70 is illustrated in FIG. 4. Initially, a few periodic metering pulse signals 72 are forwarded to wireless payphone 12. Then, once the billing rate has been determined, a single steady state billing rate signal 74 of the type described above is transmitted. Following a transition point 76 to a new billing rate, mobile switching center 16 again transmits some periodic metering pulse signals 72 until the new billing rate is reliably determined, then mobile switching center 16 transmits another steady state billing rate signal 76.

In the alternative arrangement, wireless payphone 12 is configured to calculate incurred charges both from periodic pulses and from steady state signals. Wireless payphone 12 merely switches from one calculation technique to the other upon detection of the reception of a steady state billing rate signal. Wireless payphone 12 switches to the metering pulse calculation method once an additional metering pulse signal is received.

The metering pulse signal 72 of FIG. 4 need not be tone signals identical to the tone signals of pulses received from external system 18. Indeed, depending upon constraints of the wireless system, it may not be possible or desirable to transmit tone metering pulses. In the exemplary implementation, mobile switching center 16 generates digitally encoded signals to represent the pulses. The signals are similar to the digitally encoded steady state signals but are encoded with a different bit pattern to identify the signals as discrete pulses rather than as steady state billing rate values. As can be appreciated, a wide range of encoding techniques may be employed.

Figure 6:
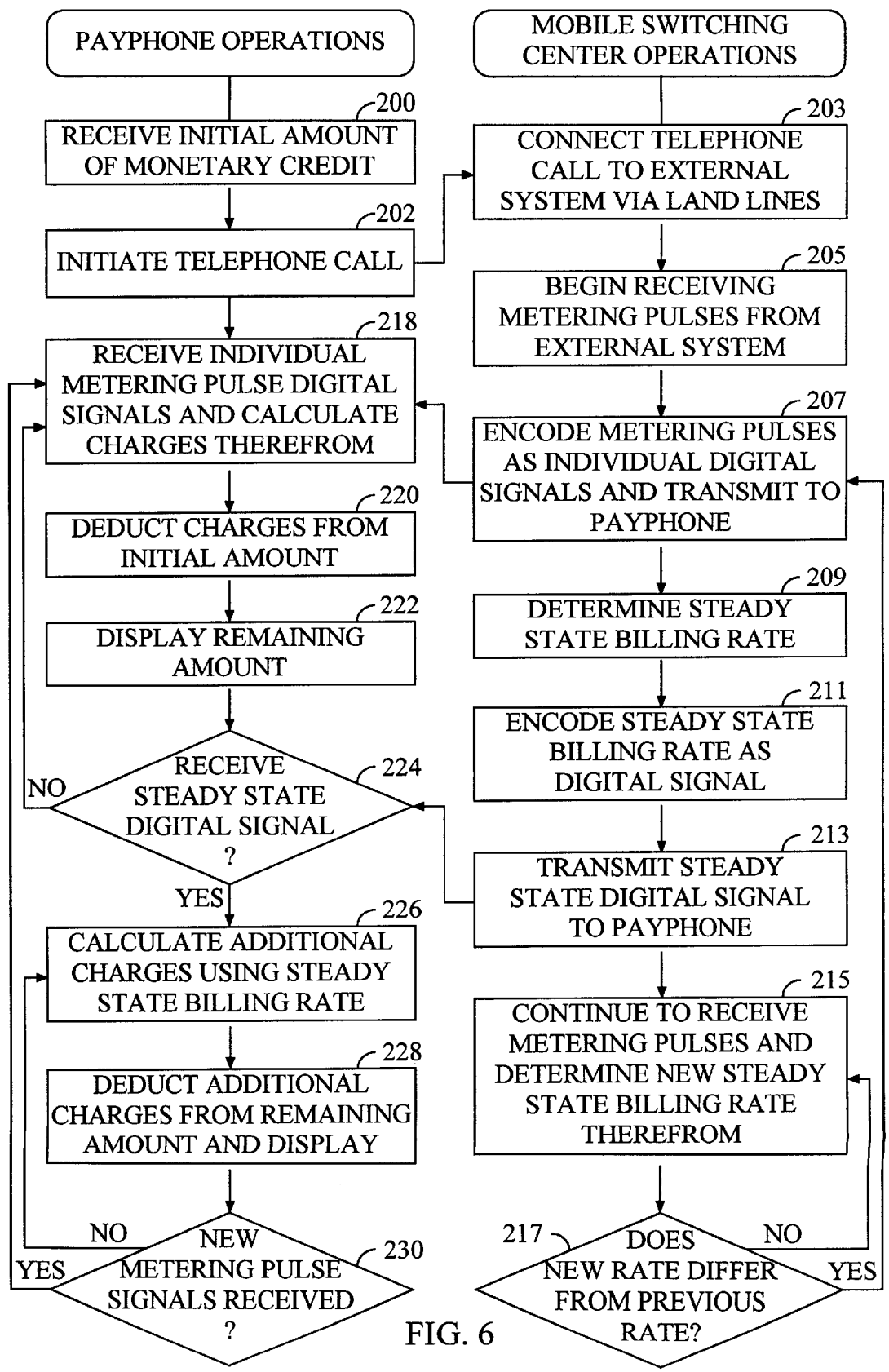
FIG. 6 is a flowchart illustrating a method for processing steady state billing rate signals of the type illustrated in FIG. 4.

FIGS. 5 and 6 provide flowcharts summarizing the two techniques described above. In both FIGS. 5 and 6, operations performed by wireless payphone 12 are shown on the left, operations performed by mobile switching center 16 are shown on the right. The operations shown are only those which relate to metering of a telephone call placed from wireless payphone 12. Numerous other operations performed by wireless payphone 12 and by mobile switching center 16 are not shown.

Referring first to FIG. 5, wireless payphone 12 receives an initial amount of monetary credit for use in placing the telephone call, step 100. Then, at step 102, the user enters the desired telephone number and the telephone call is initiated. Signals are transmitted to mobile switching center 16 where, at step 103, the telephone call is forwarded to external system 18 via land lines, such as PSTN land lines. Thereafter, at step 105, mobile switching center 16 begins to receive metering pulses from external system 18. At step 107, mobile switching center 16 determines the steady state metering rate from the received pulses and, at step 109, encodes the steady state metering rate as a digital signal. The digital signal is transmitted to wireless payphone 12 at step 111. Thereafter, mobile switching center 16 continues to receive metering pulses and repeatedly updates the steady state metering rate from the newly received metering pulses, step 113. If the new steady state rate differs from the previous rate, step 115, then execution returns to step 109 where mobile switching center 16 encodes the new steady state rate as a digital signal for transmission to wireless payphone 12. If, at step 115, the new rate does not differ from the previous rate, then execution merely returns to step 113 where mobile switching center 16 continues to monitor newly received metering pulses. Hence, execution proceeds in a loop including steps 109–115, or only steps 113–115, until the telephone call is terminated.

As to wireless payphone 12, after step 102, but before wireless payphone 12 has a chance to receive a steady state signal, wireless payphone 12 sets an internal steady state value to a default value, step 116. The default value may represent, for example, the steady state billing rate for off-peak hours. At step 118, wireless payphone 12 calculates charges incurred using the steady state value. To this end, wireless payphone 12 tracks the elapsed time and multiplies that time by the steady state value. The charges are then deducted, step 120, from the initial amount of monetary credit and the remaining amount is displayed. At step 122, wireless payphone 12 determines whether a steady state signal has been received from mobile switching center 16. If not, execution returns to step 118 where wireless payphone 12 continues to calculate charges based upon the original default steady state value rate. If, at step 122, a steady state digital signal is received, then execution proceeds to step 124 where the internal steady state value is set to the received value. Thereafter, execution returns to step 118, where additional charges are calculated using the new steady state value. Steps 118–124 are performed in a loop until the telephone call is terminated. Step 124 is, of course, only performed when a new steady state digital value is received. As noted above, for many telephone calls only a single steady state value will be received during the telephone call.

Referring to FIG. 6, the operations of wireless payphone 12 and mobile switching center 16 for the alternative arrangement wherein both steady state signals and metering pulses are transmitted to wireless payphone 12 will now be briefly described. Many of the steps of the method of FIG. 6 correspond with steps described with reference to FIG. 5 and descriptions of those steps will not be repeated. As with FIG. 5, an initial amount of monetary credit is received and a telephone call is initiated by wireless payphone 12, steps 200 and 202. The telephone call is connected to external system 18 and metering pulses are received by mobile switching center 16, steps 203 and 205. After step 205, rather than immediately determining the steady state metering rate, mobile switching center 16 encodes the metering pulses as individual signals and transmits those signals to wireless payphone 12, step 207. Then, at steps 209–213, mobile switching center 16 determines the steady state metering rate, and encodes that rate as a digital signal and transmits the digital signal to wireless payphone 12. At steps 215 and 217 mobile switching center 16 continues to process newly received metering pulses to update the steady state metering rate and to determine whether the updated rate differs from the previous rate. Steps 215 and 217 are performed in a loop until the new rate differs from the previous rate. At that point, execution returns to step 207 where mobile switching center 16 begins encoding and transmitting the individual metering pulses. Thereafter, the new steady state metering rate is determined and transmitted. Hence, steps 207–217 or only 215–217 are performed in the loop until the telephone call is terminated. During this time, mobile switching center 16 alternately transmits signals representative of metering pulses or signals representative of steady state billing rates. For each change in billing rate, mobile switching center 16 transmits metering pulses until the new billing rate can be determined then transmits only a single new steady state billing rate signal. In typical implementations no more than five or ten individual period metering pulses are transmitted before the steady state rate is determined.

As to wireless payphone 12 operations, following step 202, wireless payphone 12 receives the individual metering pulses, step 218, and calculates charges therefrom. At steps 220 and 222, the charges are deducted from the initial amount of monetary credit received and the remaining amount is displayed to the user. At step 224, wireless payphone 12 determines whether a steady state digital signal has been received. If not, execution returns to step 218. If so, execution proceeds to step 226 where wireless payphone 12 calculates additional charges using the newly received steady state metering rate. The additional charges are deducted from the remaining amount of monetary credit and the resulting figure is displayed, at step 228. At step 230, wireless payphone 12 determines whether an additional metering pulse has been received indicating a switch to new billing rate. If so, execution proceeds from step 230 to step 218 where wireless payphone 12 again calculates charges using the metering pulses rather than the steady state rate. If not, execution returns from step 230 to step 226 where wireless payphone 12 continues to calculate additional charges using the latest steady state metering rate. Thus, steps 218–230 are performed in a general loop until the telephone call is terminated.

What has been described are exemplary embodiments of a payphone metering system which substantially reduces the number of metering signals that need to be transmitted to a wireless payphone. Two specific exemplary implementations have been described herein. Numerous other implementations may be developed consistent with the principles of the invention. Although described primarily with reference to a wireless system employing CDMA techniques, the invention may be employed in other wireless systems employing other transmission protocols and in wireline systems as well. Indeed, benefits of the invention may be advantageously exploited within any signal transmission system wherein periodic metering pulses or similar periodic signals or pulses need to be transmitted. Accordingly, the exemplary embodiment described herein should not be construed as limiting the scope of the invention. Rather, the invention may be exploited in a wide range of other embodiments both to achieve the specific goals and objectives described herein as well as to achieve other goals and objectives as well.

What is claimed is:

1. A method for determining charges incurred during a telephone call connected to a wireless payphone, said method comprising the steps of:
    a) receiving at a mobile switching center individual metering pulses from an external system, each pulse representative of a common predetermined amount of monetary charge to be charged to the telephone call;
    b) transmitting from a base station a signal representative of each individual metering pulse to a wireless payphone;
    c) calculating in the mobile switching center a steady state billing rate corresponding to a rate at which the individual metering pulses are received;
    d) terminating the transmission from the base station of the signals representative of individual metering pulses to the wireless payphone when a valid steady state billing rate can be calculated and simultaneously transmitting a signal representative of the steady state billing rate to the wireless payphone;
    e) receiving within the wireless payphone the transmitted signals representative of the individual metering pulses and the steady state billing rate for the telephone call;
    f) calculating within the wireless payphone a total amount of charges incurred by incrementally summing the common amount for each individual metering pulse received; and
    g) calculating within the wireless payphone additional charges incurred by multiplying the steady state billing rate by an additional time period elapsed since receiving the steady state billing rate signal and adding the resulting value to the previously calculated total amount of charges.

2. The method of claim 1 further comprising the steps of:
    determining at the mobile switching center the rate of metering pulses received from the external system has changed;
    transmitting from the base station a signal indicating that the previous steady state billing rate signal is no longer valid, then repeating steps a)–d);
    receiving in the wireless payphone the signal indicating that the previous steady state billing rate signal is no longer valid, then repeating steps e)–g).

3. The method of claim 2 wherein the signal indicating that the previous steady state billing rate signal is no longer valid comprises an individual metering pulse signal.

4. A wirless payphone system, said system comprising:
    means for receiving from an external system a plurality of individual metering pulses each representative of an individual amount of monetary charges incurred during a telephone call;
    means for calculating a steady state billing rate corresponding to a rate at which the individual metering pulses are received;
    means for transmitting to a wireless payphone signals representative of each individual metering pulse and a signal representative of the steady state billing rate;
    means for receiving from the transmitting means the signals representative of each individual metering pulse each signal representative of an individual amount of monetary charges incurred during a telephone call;
    means for receiving from the transmitting means signals representative of the steady state billing rate incurred during said telephone call; and
    means for calculating in said wireless payphone an amount of charges incurred during the telephone call, said means for calculating utilizing said individual metering signals only during portions of the telephone call when no valid signal representative of a steady state billing rate has been received, and utilizing said steady state billing rate to calculate the amount of charges when a valid steady state billing rate has been received.

* * * * *